(No Model.)
L. J. CHURCH.
NUTMEG GRATER.
No. 295,736. Patented Mar. 25, 1884.
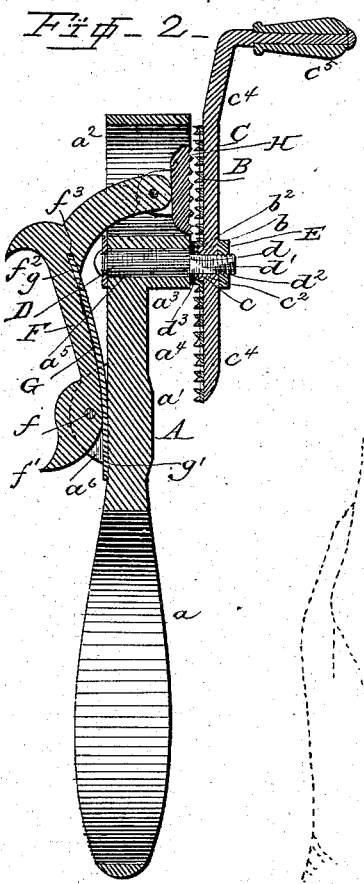
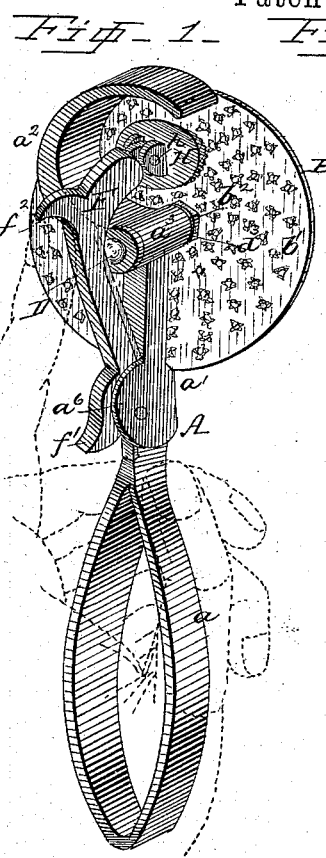
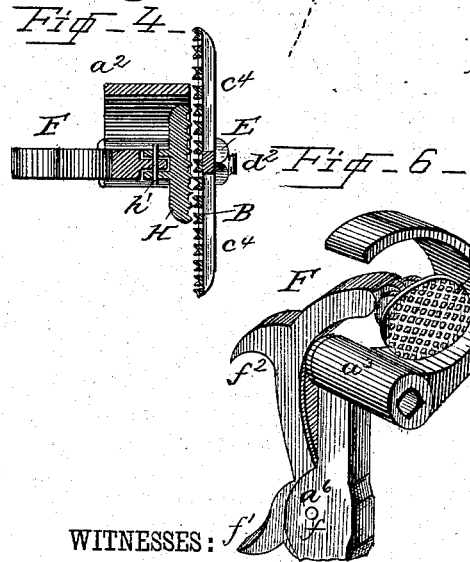
WITNESSES:
Fred. G. Dieterich
F. B. Noyes
INVENTOR
Louis J. Church,
by J. R. Littell, ATTORNEY.

United States Patent Office.

LOUIS J. CHURCH, OF WASHINGTON, DISTRICT OF COLUMBIA.

NUTMEG-GRATER.

SPECIFICATION forming part of Letters Patent No. 295,736, dated March 25, 1884.

Application filed December 29, 1883. (No model.)

*To all whom it may concern:*

Be it known that I, LOUIS J. CHURCH, a citizen of the United States, residing at Washington, in the District of Columbia, have invented certain new and useful Improvements in Nutmeg-Graters; and I do hereby declare the following to be a full, clear, and exact description of the invention, such as will enable others skilled in the art to which it appertains to make and use the same.

This invention relates to nutmeg-graters of that class in which the nutmeg is fed against a rotary grating-disk by spring-actuated lever or other mechanism; and the object of my improvement is to provide a grater of this class which will possess superior advantages in point of simplicity, inexpensiveness, durability, and general efficiency.

In the annexed drawings, Figure 1 is a perspective view of a nutmeg-grater embodying my improvements. Fig. 2 is a longitudinal sectional view of the same, taken centrally through the shaft of the rotary grating-disk. Fig. 3 is an elevation of the device, taken from the front side of the grating-disk. Fig. 4 is a detail transverse sectional view, taken through the pivoted head of the feeding-lever. Fig. 5 is a detail transverse sectional view, taken through the fulcrum of the feeding-lever. Fig. 6 is a detail perspective view of the top portion of the grater, showing the top guard-arm and head of the feeding-lever, the grating-disk being removed. Fig. 7 is a detail perspective view, showing the grating-disk and its operating arm or handle detached.

Corresponding parts in the several figures are denoted by the same letters of reference.

Referring to the drawings, A designates the body of the device, which is preferably formed of metal, and with all its parts integral, and which comprises a handle portion, $a$, a central main stem or portion, $a'$, and a segmental or semicircular top guard or finger, $a^2$, as shown. At the juncture of the stem $a'$ and the top guard, $a^2$, the body A is extended or enlarged laterally, as shown at $a^3$, and the said guard is of a width almost corresponding to this extended portion of the body. The advantages of this construction are, that the increased width of the guard enables it to more efficiently and securely retain the nutmeg in position, and that the rotary grating-disk B, which is journaled at the outer end of this enlarged or extended portion $a^3$, is retained from possible contact with the stem $a'$, there being a space, $a^4$, of a width equal to the extension $a^3$ between the side of the stem and the face of said disk. The grating-disk being thus disposed at some distance from the face of the stem $a'$, all liability of the operating-handle C of said disk engaging the hand of the operator, as it grasps the handle portion $a$ of the body A, is obviated. The curved top guard or finger, $a^2$, is of a height corresponding to one-half the diameter of the grating-disk B, so that the latter, being journaled at the enlarged portion $a^3$ at the bottom of the said curved guard, will have its periphery corresponding to the top edge of said guard, and will thus entirely close the rear end of the guard. By this relative arrangement, in which the grating-disk entirely closes the rear end of the guard, the grating-face of the disk will act upon the nutmeg at all times and in whatever position or place the nutmeg may assume in the guard.

It will be observed that the guard being of a width nearly equal to the enlarged portion $a^3$, the disk B, while it is disposed at some distance from the stem $a'$, will have its grating-face in close conjunction with the rear edge of the guard, so that when the nutmeg is grated down to a thin wafer it will not pass out between the edge of the guard and face of the disk, but will be grated entirely away.

At the enlarged portion $a^3$ of the body A (where it will not weaken the stem of the body) is provided a transverse perforation, $a^5$, which forms the bearing of the corresponding headed journal-bolt D of the disk B, this bolt being provided with a shoulder, $d$, from which it is rectangular in cross-section, as shown at $d'$, and has its rear projecting end screw-threaded, as shown at $d^2$. Against this shoulder $d$ is set a washer, $d^3$, and the disk B is provided with a central rectangular perforation, $b$, by which it is adjusted over the bolt and set on the portion $d'$ and against the washer. The disk B is preferably formed of sheet metal, and its grating face or surface $b'$ is formed by perforating or in any other suitable manner, and around the central perforation, $b$, of the disk it (the disk) is provided with a recess, $b^2$, having a rectangular or angular formation at its edges, this recess being preferably formed by depression. As the bolt D is rotated, the disk B will of course turn with it, and both the locking of the disk on the bolt and the revolution of the latter are effected by an operating arm or handle, which is designated by the letter C. This arm C comprises a central portion, $c$, in which is formed a perforation, $c'$, by which said arm is adjusted on the bolt; and this central portion, $c$, is formed with a projecting portion or enlargement, $c^2$, which corresponds to the recess $b^2$ of disk B, and is received by the same, to lock the said disk B and arm C together. A nut, E, is set against the central portion, $c$, and thus the parts are all locked in position. From the central portion, $c$, extend radial arms $c^3$ (preferably four in number) to the periphery of the disk B, one of these arms being extended beyond the periphery, as shown at $c^4$, and provided with an operating end or handle, $c^5$. These radial arms $c^3$ brace and strengthen the disk B, so that it will firmly meet the feed of the nutmeg, and will not be damaged by the pressure of the latter. It is obvious that numerous modifications may be made in this arrangement of the disk B and its operating arm or handle—as, for instance, the arm may under some circumstances be simply formed as an integral part of the disk.

F designates the feeding-lever, which is approximately right-angular in form, and is fulcrumed near its foot between two parallel wings or flanges, $a^6$ $a^6$, projecting from the lower portion of the stem $a'$, and upon a cross-pin, $f$, passing through said wings. The foot $f'$ of this lever is extended from its fulcrum, and forms a thumb-rest by which the lever can be conveniently operated against the tension of its actuating-spring to carry its head-piece from within the guard $a^2$, and permit a nutmeg to be set in the said guard through the open side of the same. At the vertex of the angle of the lever F is formed a projecting shoulder or lug, $f^2$, which is engaged by the forefinger of the hand, when the device is in use, to increase the pressure of the lever against the nutmeg, or to otherwise regulate the feed of the latter against the grating-disk. The lever F is retained in its normal position, in which it acts against the nutmeg to retain it in place in the guard $a^2$, by means of a flat spring, G, which has its fixed end $g$ set in a corresponding recess, $f^3$, formed in the inner edge of the lever F, and at or near the vertex of its angle, and the spring retains its position in this recess, by its own tension acting against the side of said recess. The free end $g'$ of spring G is disposed between the fulcrum of lever F and the stem $a'$, and it is consequently received between the wings $a^6$ $a^6$, and is protected by these wings from lateral displacement or accidental damage.

H designates the head of the feeding-lever, which is provided with the usual serrated or roughened face $h$, for engaging the nutmeg. This head is pivoted by a cross-pin, $h'$, to the end of the feed-lever F, so that the said head has a free movement to follow the changes in the position of the nutmeg. By this pivotal arrangement the nutmeg will be fed more evenly to the grating-disk, and the head will move in a straight plane in the guard $a^2$, though the lever end or head will describe an arc, the lever having a fixed fulcrum.

From the foregoing description and annexed drawings, the operation and advantages of my invention will be readily understood and appreciated. The nutmeg can be quickly and conveniently set in the guard or finger by simply operating the lever against the tension of its spring to draw its head back in the guard, when, as soon as the lever is released, its head will bind against the nutmeg to force it against the grating-disk, the feed of the nutmeg being augmented by pressure with the forefinger upon the shoulder of said lever.

The feed of the nutmeg with my improved device will be even and regular, and the general operation can be effected with great facility and convenience.

I claim as my invention—

1. The herein-described body for nutmeg-graters, the same consisting of a handle portion, a central stem, and a curved or segmental top guard-finger, all the parts being integral, substantially as set forth.

2. The combination in a nutmeg-grater, with the stem of the body provided with the lateral extension and with the curved or segmental guard-finger extending from this extension, of the bearing-bolt journaled in said extension, and the rotary disk secured to the outer end of the said bolt, substantially as set forth.

3. The combination, with the grating-disk, of an operating handle or arm connected centrally therewith, and comprising a series of bracing-arms extending radially to the periphery of the disk, substantially as set forth.

4. The combination, in a nutmeg-grater, with the feeding-lever, of a head pivoted to the lever and acting directly against the nutmeg, substantially as and for the purpose set forth.

5. The combination, in a nutmeg-grater, of the body comprising the stem and the integral segmental guard-finger, the rotary grating-disk journaled at the juncture of the stem and guard-finger, and the approximately right-angular feed-lever fulcrumed to the stem, and having its head working in the guard-finger, substantially as set forth.

6. The combination of the body of the grater, comprising the handle portion, the integral stem having the lateral wings, and the integral segmental finger extending from the stem, the rotary grating-disk journaled at the vertex of the angle formed by the stem and segmental finger, the approximately right-angular feed-lever fulcrumed between the said wings, and having a pivoted head moving in the finger, and the flat actuating-spring connected with the lever, and having its free end extending between the said wings, substantially as set forth.

7. A nutmeg-grater embodying the stem, having the lateral wings, the feed-lever fulcrumed between these wings, and having the recess, and the flat spring having one end set in the recess and its other end extending down between the lever and stem, and protected from damage or displacement by the said wings, substantially as set forth.

8. A nutmeg-grater embodying a body comprising the stem and the integral segmental guard-finger, the rotary grating-disk journaled at the vertex of the angle formed by the stem and said finger, the approximately right-angular feed-lever fulcrumed to the stem and having the pivoted head working in the finger, and provided with the foot or extension below its fulcrum, by which it can be operated to draw its head from the grating-disk, and the spring engaging the lever to normally force its head toward the grating-disk, substantially as set forth.

In testimony whereof I affix my signature in presence of two witnesses.

LOUIS J. CHURCH.

Witnesses:
J. REED LITTELL,
C. A. NEALE.